United States Patent [19]
Kakihara

[11] 3,863,737
[45] Feb. 4, 1975

[54] LUBRICATING OIL SUPPLYING APPARATUS FOR STERN TUBE BEARING

[75] Inventor: Minoru Kakihara, Okayama, Japan

[73] Assignee: Mitsui Shipbuilding and Engineering Co., Ltd., Tokyo, Japan

[22] Filed: May 14, 1973

[21] Appl. No.: 359,667

[30] Foreign Application Priority Data
May 19, 1972  Japan.............................. 47-50103

[52] U.S. Cl................ 308/122, 115/34 R, 184/1 R, 308/DIG. 12
[51] Int. Cl. .......................................... F16c 17/10
[58] Field of Search.................. 184/1 R; 115/34 R; 308/DIG. 12, 240, 9, 122

[56] References Cited
UNITED STATES PATENTS

| | | | |
|---|---|---|---|
| 2,203,039 | 6/1940 | Aker | 308/DIG. 12 |
| 3,631,834 | 1/1972 | Gardner et al. | 115/34 R |
| 3,653,350 | 4/1972 | Koons et al. | 184/1 R |
| 3,684,333 | 8/1972 | Flett et al. | 308/122 |

FOREIGN PATENTS OR APPLICATIONS

| | | | |
|---|---|---|---|
| 179,235 | 3/1962 | Sweden | 308/DIG. 12 |
| 1,034,930 | 7/1958 | Germany | 308/240 |

*Primary Examiner*—Manuel A. Antonakas
*Assistant Examiner*—S. J. Richter
*Attorney, Agent, or Firm*—Howson & Howson

[57] ABSTRACT

A stern tube bearing assembly is disclosed having means for flowing a lubricating fluid from the fore end of the assembly to a reservoir at the aft end thereof before returning along the inside of the bearing for discharge from the fore end of the bearing than the fore side, providing oil grooves to an after side oil reservoir for firstly feeding the oil to the after side.

1 Claim, 3 Drawing Figures

LUBRICATING OIL SUPPLYING APPARATUS FOR STERN TUBE BEARING

The present invention relates to a lubricating oil supplying apparatus for a stern tube bearing of ships.

In a conventional stern tube bearing, it is important for the rearwardmost bearing surfaces to be adequately supplied with fresh oil of the highest quality in order to prevent the surfaces from overheating and possibly causing seizure of the bearing upon rotation of the propeller shaft therein.

The present invention has for its object to provide an apparatus which may supply new lubricating oil to the rear portion of the stern tube bearing, thus eliminating the aforesaid drawbacks.

In summary, the present invention provides a stern tube bearing assembly with oil supply passages for communicating lubricating oil to an oil reservoir at the aft end of the assembly before the oil is admitted to the bearing surface. Thus, fresh lubricating oil supplied initially to the aft reservoir tends to expedite heat exchange between the oil and the rear portion of the bearing assembly, thereby minimizing the accumulation of heat in the assembly and a concomitant increase in temperature.

IN THE DRAWINGS

Figure 1:
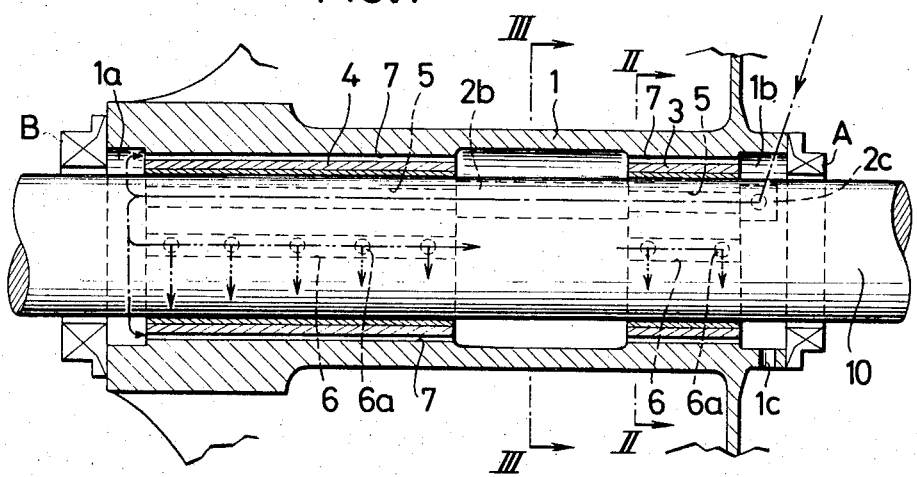
FIG. 1 is a cross-sectional view of a lubricating oil supply apparatus in accordance with the present invention.
Figure 2:
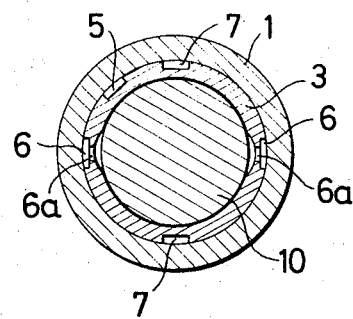
FIG. 2 is a cross-sectional view along the line II — II of FIG. 1.
Figure 3:
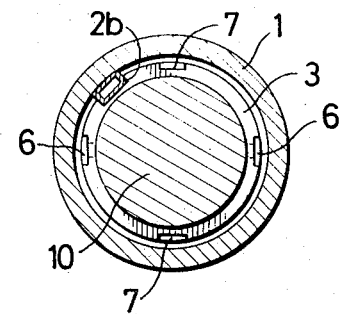
FIG. 3 is a cross-sectional view along the line III— III of FIG. 1.

Referring now to the drawing, a stern tube 1 has a bearing 3 located in its fore or front end and a bearing 4 located in its aft or rear end, the bearings 3 and 4 rotatably receiving a propeller shaft 10. A lubricant sealing member A is provided at the fore end of the stern tube 1, and a lubricant sealing member B is provided at the aft end. The sealing members A and B cooperate with the stern tube 1 and the ends of the bearings 3 and 4 to form oil reservoirs 1a and 1b, respectively. Oil or lubricant grooves 6 and 7 are provided at four spaced locations on the upper and lower sides of the peripheries of the bearings 3 and 4, and the grooves 6 and 7 are coextensive in length with the bearings, extending axially therealong. The bearings 3 and 4 are provided with a series of apertures 6a which provide fluid communication between the internal surfaces thereof and the grooves 6. Lubricant supply groups 5 are also provided on the peripheries of the fore bearing 3 and the aft bearing 4, and the grooves 5 are coextensive in length with the bearings 3 and 4. Both oil grooves 5 are connected intermediate the bearings 3 and 4 by an oil trough 2b which is provided inside the stern tube 1. The groove 5 and trough 2b provide a passage for supplying lubricant exclusively to the rear lubricant reservoir 1a of the stern tube bearing assembly. In addition, an inlet 2c adjacent the fore end of the bearing assembly is provided for supplying a lubricant to the channel 5 from a source of lubricant such as a gravity tank or pump. If desired, the lubricant supply grooves may be provided in the stern tube 1 rather than in the peripheries of the bearings 3 and 4.

In operation, new lubricating oil from outside is introduced into the oil reservoir 1a after through the oil channel 2c, the oil groove 5 of the fore side bearing 3, the oil channel 2b, and the oil groove 5 of the aft side bearing 4 as shown by chain lines. The lubricating oil transferred into the oil reservoir 1a flows into other oil grooves 6 and 7 on the peripheries of the aft side bearing 4 and the fore side bearing 3 and reaches the fore side oil reservoir 1b of the stern tube 1, thereafter returning from an oil discharge aperture 1c to a bottom tank in the engine room. The lubricating oil passing the oil groove 6 in the course is drawn into the inside of the bearing from oil apertures 6a communicating with the inside surface of the bearing. Thus new oil is supplied to the surface of the bearing as well as removing the generated heat. Since the aft bearing 4 is larger than the fore bearing 3, more lubricant is supplied to the aft bearing than to the fore bearing, as indicated in FIG. 1.

As evident from the above description, according to the present invention, fresh lubricating oil is always supplied to the aft bearing surface which requires fresh lubricating oil most. Thus, the exchange of lubricating oil is expedited, and the accumulation of heat and the consequent elevation of temperature of the bearing assembly is suppressed, whereby seizure of the bearing assembly is prevented.

What is claimed is:

1. A lubricated stern tube bearing assembly, comprising: a bearing, a stern tube surrounding said bearing, a shaft extending through said stern tube and rotatably mounted in said bearing, sealing means associated with said shaft at opposite end of said stern tube for cooperating with said bearing and stern tube to define a fore lubricant reservoir at one end of said bearing and an aft lubricant reservoir at the other end of said bearing, passage means for flowing lubricant through said tube and along said bearing and to the aft reservoir from a location adjacent said fore reservoir, a plurality of peripherally-spaced lubricant grooves extending longitudinally in said assembly between said bearing and said tube for providing fluid communication between said reservoirs, said bearing having a plurality of apertures providing fluid communication between said lubricant grooves and said shaft, and means providing a lubricant outlet from said fore reservoir, whereby lubricant supplied to the aft reservoir returns through the grooves to the fore reservoir while lubricating and cooling the bearing.

* * * * *